United States Patent
Sands et al.

(10) Patent No.: US 6,817,541 B2
(45) Date of Patent: *Nov. 16, 2004

(54) OZONE SYSTEMS AND METHODS FOR AGRICULTURAL APPLICATIONS

(75) Inventors: David Alan Sands, Paso Robles, CA (US); Allen D. Clawson, Atascadero, CA (US); Dennis Lavelle, Paso Robles, CA (US); Henry Schmitz, San Luis Obispo, CA (US)

(73) Assignee: Del Industries, Inc., San Luis Obispo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/334,108

(22) Filed: Dec. 30, 2002

(65) Prior Publication Data

US 2003/0150933 A1 Aug. 14, 2003

Related U.S. Application Data

(63) Continuation of application No. 09/655,030, filed on Sep. 1, 2000, now Pat. No. 6,499,671.

(51) Int. Cl.[7] .......................... A62C 5/02; A01G 25/09
(52) U.S. Cl. .......................... 239/8; 239/159; 239/172; 47/1.01 R; 210/760
(58) Field of Search ................ 239/8, 77, 78, 239/146, 159, 172; 47/1.01 R, 58.1 R, 48.5; 210/760

(56) References Cited

U.S. PATENT DOCUMENTS

| | | |
|---|---|---|
| 2,203,980 A | 6/1940 | Burt |
| 3,198,726 A | 8/1965 | Trikilis |
| 4,143,118 A | 3/1979 | Laing |
| 4,869,881 A | 9/1989 | Collins |
| 4,874,560 A | 10/1989 | Titmas |
| 4,966,717 A | 10/1990 | Kern |
| 4,967,960 A | 11/1990 | Futrell |
| 4,995,123 A | 2/1991 | Kern |
| 5,032,265 A | 7/1991 | Jha et al. |
| 5,098,415 A | 3/1992 | Levin |
| 5,250,177 A | 10/1993 | Cho |
| 5,368,815 A | 11/1994 | Kasting, Jr. et al. |
| 5,433,866 A | 7/1995 | Hoppe et al. |
| 5,501,844 A | 3/1996 | Kasting, Jr. et al. |
| 5,520,893 A | 5/1996 | Kasting, Jr. et al. |
| 5,561,944 A * | 10/1996 | Ismail et al. ............. 47/58.1 R |
| 5,566,627 A * | 10/1996 | Pryor ......................... 47/48.5 |
| 5,598,316 A | 1/1997 | Kasting, Jr. |
| 5,674,312 A | 10/1997 | Mazzei |
| 5,697,187 A * | 12/1997 | Persinger ..................... 47/48.5 |
| 5,803,139 A | 9/1998 | Kennedy |
| 5,816,498 A * | 10/1998 | Smith et al. ................. 239/172 |
| 5,834,031 A | 11/1998 | Martin et al. |
| 6,132,629 A | 10/2000 | Boley |
| 6,173,527 B1 * | 1/2001 | Pryor ..................... 47/58.1 R |
| 6,279,589 B1 * | 8/2001 | Goodley .................... 239/146 |
| 6,455,017 B1 * | 9/2002 | Kasting et al. ............. 239/146 |
| 6,499,671 B1 * | 12/2002 | Sands et al. ................. 239/172 |

FOREIGN PATENT DOCUMENTS

JP        2215333      8/1990

* cited by examiner

Primary Examiner—Steven J. Ganey
(74) Attorney, Agent, or Firm—Stout, Uxa, Buyan & Mullins, LLP; Frank J. Uxa; Linda A. Fox

(57) ABSTRACT

An ozone system for agricultural applications generally includes a water flow line having an inlet for receiving a flow of clean water from a water source, an ozone injector suitable for producing a high concentration of ozone in oxygen, and a venturi injector for injecting the ozone gas into the water flowing through the flow line to produce an ozonated water stream. In addition, the system includes a degassing assembly for separating and removing undissolved ozone gas from the ozonated water stream and an ozone destruct assembly adapted to destroy the undissolved ozone. The entire system is motorized vehicle mountable to provide ease in applying the ozonated water stream from the system to agricultural crops.

27 Claims, 5 Drawing Sheets

OZONE SYSTEMS AND METHODS FOR AGRICULTURAL APPLICATIONS

This is a continuation in part of U.S. patent application Ser. No. 09/655,030 filed on Sep. 1, 2000 now U.S. Pat. No. 6,499,671.

BACKGROUND OF THE INVENTION

The present invention generally relates to ozone systems and methods and more specifically relates to such systems and methods for agricultural applications, for example for treating living grapevines in vineyards.

Ozone exists as an unstable blue gas. It has been found to be an effective oxidizing agent, and has been used for the purification of drinking water, in industrial waste treatment, for deodorizing air and sewage gases, as a bleach for waxes, oils and textiles, and as an oxidizing agent in chemical processes. Furthermore, in sufficient concentrations, ozone is known to destroy bacteria, fungi, viruses and other microorganisms. Various devices and processes have been developed for disinfecting air and surfaces using ozone gas or ozonated water.

Ozonated water can be used for sanitizing surfaces without heat treatment and without the use of potentially harmful chemicals. This is of particular interest in the development of processes using ozone for treating the surfaces of food products. Unlike other rinse agents, an ozone/aqueous rinse does not leave behind a residue that later needs to be removed from the food product surface.

Not surprisingly, therefor, various methods and systems for treating food products using the known antimicrobial properties of ozone have been developed. More recently, processes using ozone for the treatment of living, agricultural crops have been proposed.

Typically, treatment of crops using ozonated water is accomplished as follows. A stationary water station is provided, for example a stationary tank having a 500 gallon capacity. Ozone gas is introduced into the water tank to form an ozone water mixture in the tank. A tractor or other vehicle is filled with a portion of this ozone water mixture, which is then transported and sprayed onto agricultural crops to treat diseases and pests, such as unwanted or harmful microorganisms.

Smith, Jr. et al U.S. Pat. No. 5,816,498, the disclosure of which is incorporated herein in its entirety by this specific reference, discloses an ozone spray system and method for treating bacteria or fungi on agricultural crops, namely a crop of growing Vidalia onions. The Smith Jr. et al system is an agricultural field and crop sprayer that produces and applies ozonated water to such an agricultural crop. According to Smith Jr. et al, ozonated water is produced by recirculating water to a tank initially containing water free of ozone. The water from the tank is passed through a venturi injector connected to an ozone generator, and then back into the tank until a desired ozone concentration is reached in the tank. A vehicle, for example a tractor driven vehicle, is used to transport a portion of the ozone water mixture through a field of agricultural crops. Ozonated water is sprayed from the tank and onto the crops.

One drawback of the Smith Jr. et al system, as well as other similar systems, is that ozone concentration in the water tank is increased incrementally and gradually as the water is recirculated continuously through an ozone injector, until the desired concentration is reached. Thus, the Smith Jr. et al system therefor requires careful monitoring of the ozone level in the tank, as well as a relatively long waiting period before an effective concentration is reached.

Entire vineyards of grapevines have been seriously damaged or destroyed by the rapid spread of microbial infestations on the growing plants. Generally, these organisms take up residency in the woody stock of a vine and spread to the foliage throughout the growing season, ultimately damaging the berries and contaminating the juice. Such damage/destruction has substantial adverse economical impact, for example, on the wine industry.

It would be advantageous to provide new systems and methods which address one or more of these concerns, for example, while treating agricultural crops, such as living and/or growing grapevines in vineyards.

SUMMARY OF THE PRESENT INVENTION

New ozone systems and methods for agricultural applications have been discovered. The present invention provides safe and effective systems and methods of ozone treatment for agricultural applications which address one or more of the above-noted and other problems. The present ozone systems and methods are highly effective in the treatment of agricultural crops, particularly in the treatment of grapevines in vineyards for control of mildew, other fungi and other microorganism-based infestations. The present systems are straightforward in construction and use. The present methods are easy to practice and provide effective treatments with no significant detrimental effect on the crop or crops being treated.

The agricultural crop treated using the systems and methods of the invention may comprise an agricultural crop selected from the group of crops consisting of leafy vegetable crops, cole crops, legume crops, annual fruit crops and perennial fruit crops. Some embodiments of the invention have been found to be particularly useful for treating and maintaining the health of row crops, for example leafy, relatively low growing row crops, such as crops that are generally less than about two feet in height above a ground level, or less than about one foot in height above a ground level.

An ozone system for agricultural applications, in accordance with the present invention, generally comprises a portable unit that functions to combine a stream or flow of water, preferably substantially free of ozone, with ozone, preferably produced from oxygen-enriched air, to create an ozonated water stream which, substantially directly after being formed, is used to treat agricultural crops, such as plants, fruit on plants, foliage on plants, grapevines and the like. Unlike earlier systems using ozonated water to treat plant diseases, the present invention uses an ozonated water stream formed by a single pass stream of water through an ozone injector, dispensed or applied substantially directly after formation to the crops, preferably employing a spray assist assembly which advantageously provides a high volume, low pressure gaseous component to assist the dispensing of the ozonated water stream.

Moreover, unlike other ozonated water spray systems, the present systems preferably are designed as self-contained, preferably portable, units. The systems include a fluid passageway having an inlet for receiving a flow of water, for example, from a water source. An ozone generator is included. Preferably, ozone is generated using a corona discharge ozone generator for producing a gaseous stream comprising a high concentration of ozone from oxygen, an oxygen-enriched gaseous stream or air. Preferably, the corona discharge generator is adapted to generate ozone in quantities of between about 5 and about 30 grams per hour, and at a concentration of between about 1% and about 5% by weight of the ozone-containing gaseous stream. The ozone preferably is generated directly from an oxygen-enriched gaseous stream, e.g., produced by an oxygen concentrator assembly, for example, of conventional design, or air. The ozone from the gaseous stream is introduced into the water stream or flow by any suitable means, for example, using a venturi injector or like injection assembly. The venturi injector provides a source of suction which urges the ozone-containing gaseous stream from the ozone generator into the water stream or flow. The water is passed through the venturi injector only once prior to dispensing the ozonated water onto the crops through an outlet assembly connected to the fluid passageway. A spray assist assembly preferably is included, as described elsewhere herein, to assist in dispensing the ozonated water for agricultural application.

Optionally, the present ozone systems may include one or more of several subsystems, such as a degassing assembly, hereinafter sometimes also referred to as a degas/separator assembly, for removing undissolved ozone gas from the ozonated water stream, and an ozone destruct assembly in communication with the degassing assembly, for destructing the undissolved ozone gas, and preferably venting the product of ozone destruction, preferably oxygen, into the atmosphere. To ensure effective destruction of ozone gas, a two step process is preferably employed in the destruct assembly. Thus, the undissolved ozone gas stream preferably is both heated and thereafter passed through a catalytic chamber to provide for enhanced ozone destruction.

One or more components of the present systems, such as the oxygen concentration assemblies, the ozone generators, the ozone injection assemblies and the spray assist assemblies, preferably all of such system components, are sized and adapted to be mountable, directly or indirectly, to a motorized vehicle for transporting during operation thereof. Using such a motorized vehicle allows the present systems to be used effectively in relatively large crop fields, e.g., vineyards. The "one-thru" ozone generation feature of the present systems also enhances the ability of the present systems to treat relatively large fields.

In addition, in one advantageous embodiment of the invention, a pressure regulating subsystem is provided for maintaining a consistent, regulated internal pressure of the aqueous stream as the stream is processed within the unit or system. The pressure regulating subsystem preferably includes a plurality of, for example three, pressure regulator valves for controlling pressure in various parts of the unit, both upstream and downstream of the venturi injector. In this embodiment, the system is adapted to receive a flow of water from any suitable water source, for example, a municipal water supply, which may have different pressures at different locations, a water reservoir, a stationary water tank, or a transportable water tank mounted to a motorized vehicle. Advantageously, the system is adapted to meet different, varied parameters that are customer or user specific, for example, water reservoir pump capacity. Because the system is a "once through" or single pass ozone generation system, there is no recirculation of ozonated water back to the water source, for example, the water tank. Therefore, the volume of water in the tank or other water source may fluctuate as the source is emptied and refilled, without affecting the concentration of ozone in the ozonated water being applied to the crops.

In addition, initial water pressure to the system may be provided by a pump assembly which is powered by a motorized vehicle on which the remainder of the system is mounted and/or transported during operation, for example, in a crop field, e.g., vineyard. Thus, for example, while the tractor is pulling the system between rows of crops at a substantially constant speed, constant incoming water pressure is being supplied by the pump, thus enabling consistent dispensing of the ozonated water to the crops.

In another broad aspect of the present invention, methods for treating an agricultural crop are provided. Such methods, in general, comprise:

providing a flow of water;

generating a gaseous stream containing ozone;

introducing the ozone from the gaseous stream into the flow of water to form an ozonated water stream;

combining the ozonated water stream with a flowing gaseous component, preferably comprising air, to produce a mixed gaseous component/ozonated water stream; and dispensing the mixed gaseous component/ozonated water stream to an agricultural crop.

In a different aspect of the invention, a method for treating an agricultural crop is provided, the method comprising the steps of providing a flow of substantially ozone-free water; generating an ozone-containing gaseous stream; forming a substantially continuously flowing ozonated water stream by introducing the gaseous stream into the flow of substantially ozone-free water; and directly applying the ozonated water stream to at least a portion of an agricultural crop; the steps of generating, forming and directly applying being performed by means of a transportable water processing system.

The step of forming preferably comprises forming an ozonated water stream having an ozone concentration of at least about 0.5 ppm to about 2.5 ppm.

In another aspect of the invention, the agricultural crop is an agricultural crop selected from the group of agricultural crops consisting of leafy vegetable crops, cole crops, legume crops, annual fruit crops, and perennial fruit crops, and the dissolved ozone concentration is selected based, at least in part, upon the type of crop being treated.

For example, in some embodiments of the invention, the agricultural crop is a leafy vegetable crop, for example a crop of lettuce plants. In this case, it has been discovered that the step of forming preferably comprises forming an ozonated water stream having a dissolved ozone concentration of at least about 1.0 ppm, and more preferably having a dissolved ozone concentration of at least about 1.5 ppm.

In other embodiments of the invention, the agricultural crop being treated is a low growing, leafy plant bearing delicate fruits, for example a crop of strawberry plants. In this case, it has been discovered that the step of forming preferably comprises forming an ozonated water stream having a dissolved ozone concentration of no greater than about 1.0 ppm, in order to treat the plant without causing damage to the delicate fruit, which may occur upon application of higher concentrations of dissolved ozone.

Preferably, for the treatment of open, leafy, low growing row crops, the step of directly applying comprises applying the stream of ozonated water as droplets of ozonated water, for example onto leafy portions of the crop, in lieu of applying the stream of ozonated water with the assistance of a high pressure and/or blower assisted sprayer.

For example, the step of directly applying comprises applying the stream of ozonated water from a liquid nozzle.

The present systems, as described elsewhere herein, may be employed in practicing the present methods.

In one very useful embodiment, the present methods further comprise transporting the ozonated water stream on a motorized vehicle prior to the dispensing step. In some embodiments of the invention, the method comprises the step of transporting the water processing system, intact (that is, without prior disassembly and/or later reassembly of the system) to another portion, for example another row, of the agricultural crop, and then repeating the steps of generating ozone gas, forming an ozonated water stream, and directly applying the ozonated water stream to the plants.

Although the present methods may be used to treat any suitable agricultural crop, such methods are particularly useful to treat living grapevines in vineyards. Such treatment methods have been found to be very effective in controlling/managing/preventing microbial infestations on grapevines while having no significant detrimental effect on the grapevines, on the foliage or on the fruit or wine produced therefrom. In addition, such methods are environmentally friendly and do not present any significant health risks to the humans practicing the methods or who are otherwise in the vineyards.

Each and every feature described herein, and each and every combination of two or more of such features, is included within the scope of the present invention provided that the features included in such combinations are not mutually inconsistent.

BRIEF DESCRIPTION OF THE DRAWINGS

The present invention will be more clearly understood and the advantages thereof more readily appreciated with reference to the following detailed description and claims when considered in conjunction with the accompanying drawings of which:

DETAILED DESCRIPTION

Turning now to FIGS. 1, 1a, 2 and 2a, an ozone system for agricultural applications in accordance with the present invention is shown generally at 10.

Figure 1:
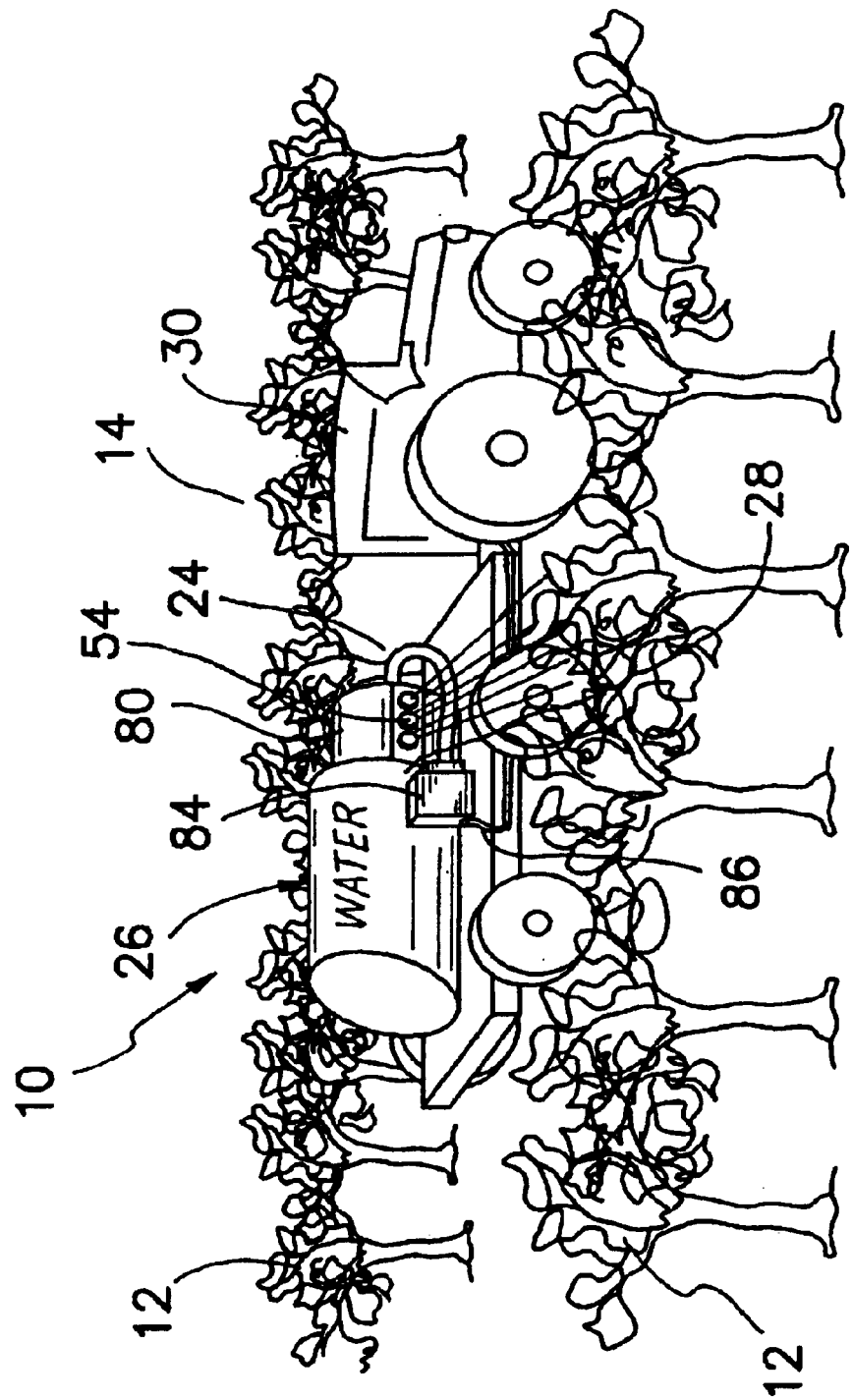
FIG. 1 shows a perspective view of an embodiment of the invention being used to treat grapevines.

As shown in FIG. 1, the system 10 is effective for treating grapevines 12 in a vineyard 14 by controlling harmful mildew and other microbial infestations that are known to cause serious and widespread destruction of these grapevines and/or loss in grape production. Other, canopy forming, and/or woody agricultural plants, vines and trees can also be treated with different embodiments of the present invention.

Figure 1A:
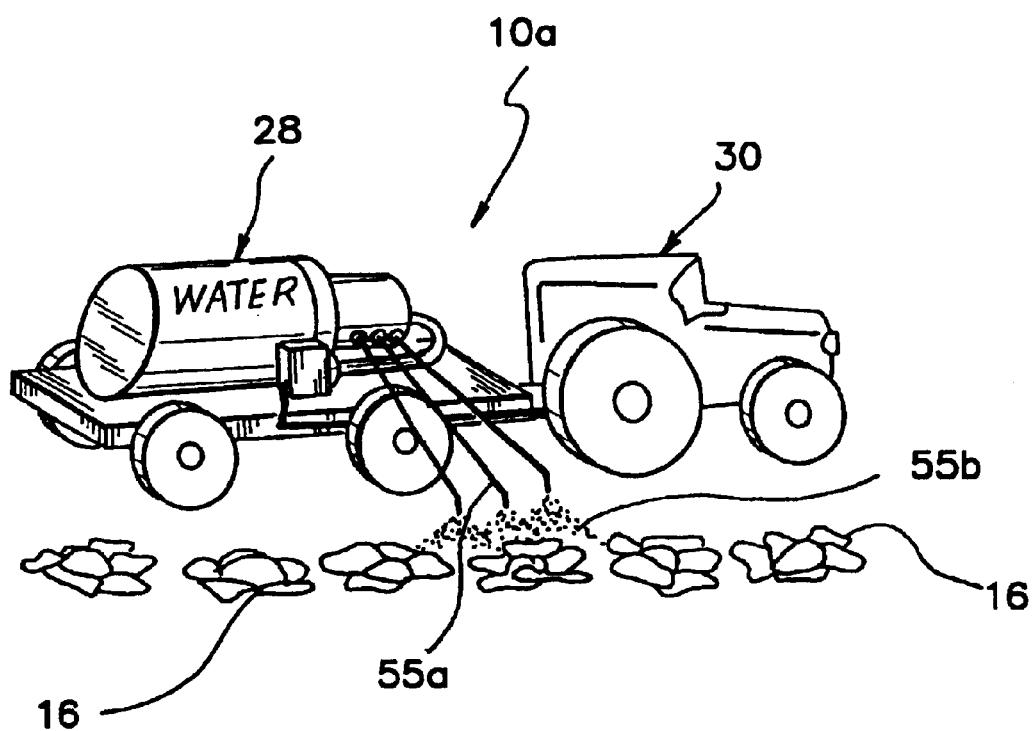
FIG. 1a shows a perspective view of an embodiment of the invention being used to treat relatively low growing leafy crops.

FIG. 1a shows an embodiment 10a of the invention being used to treat leafy row crops, for example, a row of lettuce or cabbage plants 16.

Figure 2:
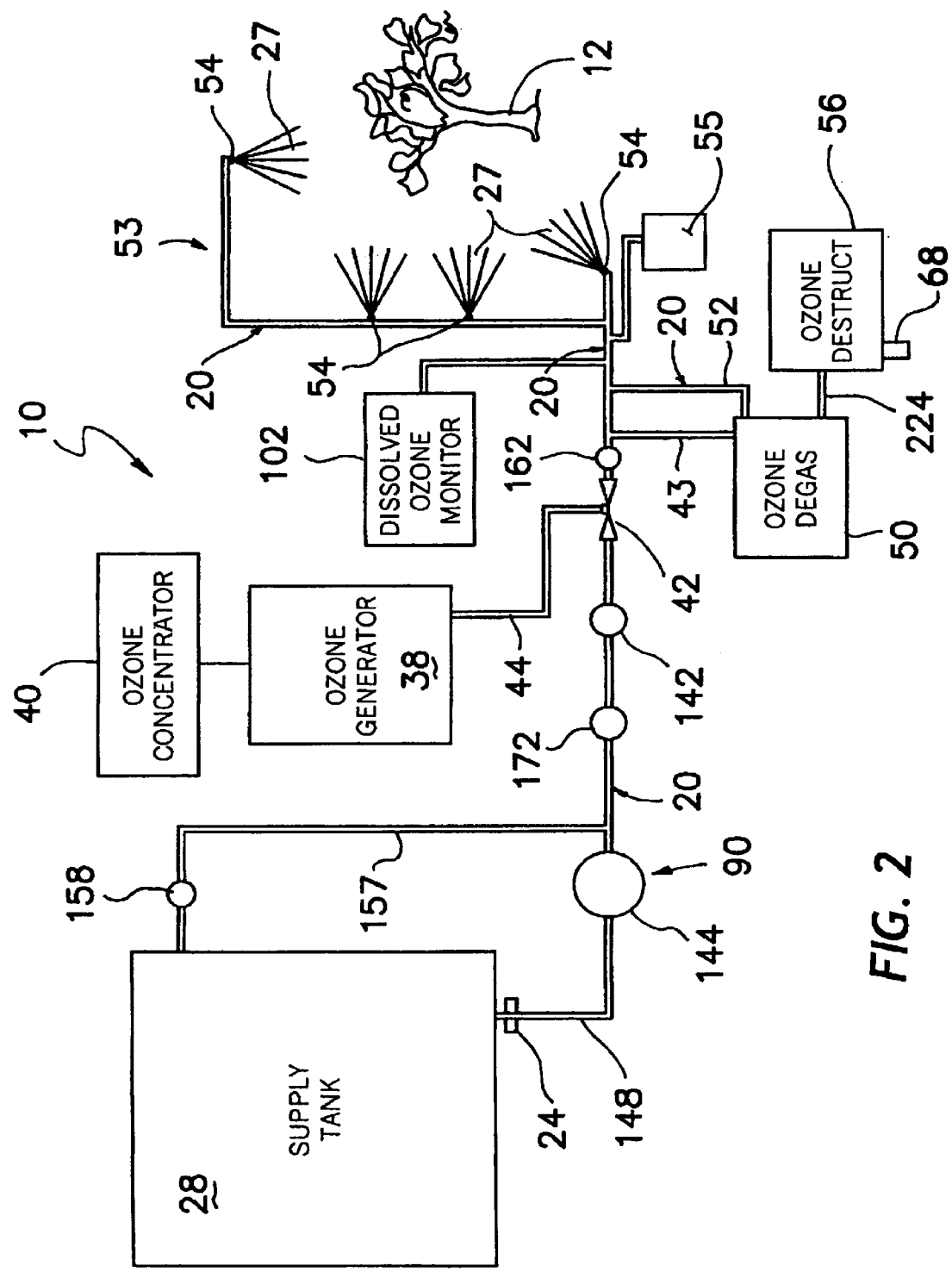
FIG. 2 shows a schematic representation of an ozone system in accordance with the invention.
Figure 2A:
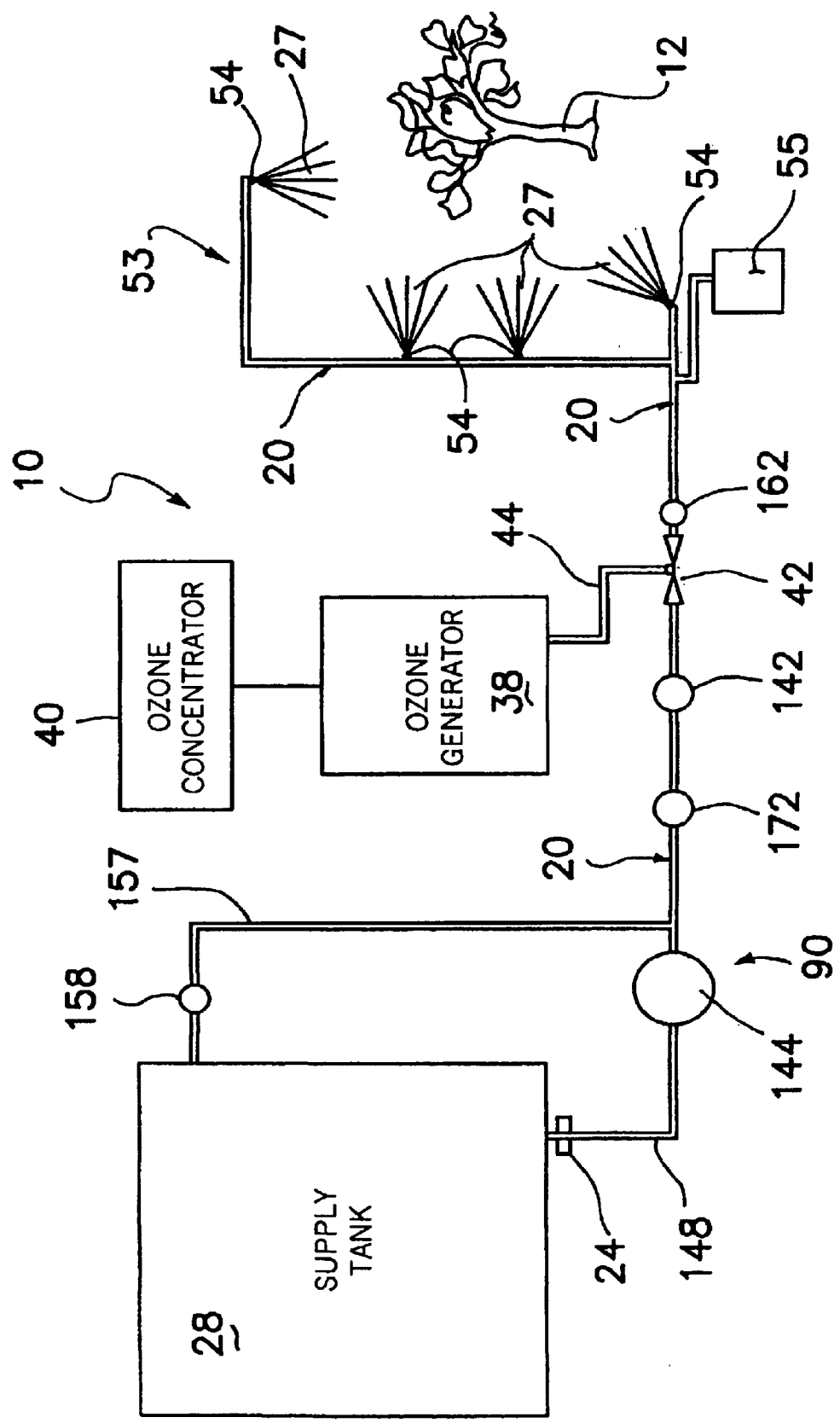
FIG. 2a shows a schematic representation of an alternative embodiment of the present invention.

Referring now specifically to FIG. 2 and FIG. 2a, the ozone system 10 generally comprises a piping assembly or fluid passageway 20, including an inlet 24 adapted to receive a flow of water from a water tank or water source. The fluid passageway 20 is structured for providing a continuous flow of water from a clean, for example, substantially ozone-free, water source through the inlet 24 and ultimately to application of the water as an ozonated water discharge spray 27 having a concentration of ozone effective in reducing levels of harmful microorganisms on the grapevine 12.

The water source may be provided by, for example, a municipal water supply, a stationary water reservoir fixed proximate the agricultural field (vineyard) to be treated, a portable water tank and pump assembly, or other means for providing a flow of fresh or clean water. FIGS. 1 and 1a show embodiments of the invention in which the water source is provided by a tank 28 mounted to a motorized tractor vehicle 30. One or more components of the system 10 or 10a can be adapted to be mounted or mountable directly to a motorized vehicle, such as to a tractor or other motorized vehicle, or indirectly to a motorized vehicle, such as to a trailer or pull cart which is removably coupled to and pulled by a motorized vehicle, for example, a tractor or other motorized vehicle. Both such direct and indirect embodiments are included within the scope of the present invention.

The ozone system 10 further comprises an ozone generator 38 for producing a gaseous stream containing ozone. The ozone generator 38 preferably is comprised of a corona discharge ozone generator, which typically has the attributes of being relatively small in size in comparison to other ozone generators, and produces a relatively large amount of ozone, for example, at least about 5 grams of ozone per hour. More specifically, the ozone generator 38 is adapted to generate between about 5 and about 30 grams of ozone per hour, and in some embodiments up to about 100 grams per hour of ozone, and at concentrations of between about 1% and about 5% by weight of the ozone-containing gaseous stream. The system 10 may, and preferably does, also comprise an oxygen concentrator 40, for example, of conventional design, or other suitable means for providing a sufficiently high concentration of oxygen, for example, oxygen gas present in oxygen-enriched air, to the ozone generator 30 to obtain the required quantity and concentration of ozone.

The required ozone quantity varies depending on various factors, for example, the size of the crop field or area to be treated, the number of rows of crops, e.g., grapevines, to be treated, the type of crop to be treated, the density of the crop in the area to be treated and the like factors.

Selection of an optimal dissolved ozone concentration in the discharge stream is possible by adjusting the amount and pressure of the flow of water through the system to the venturi injector and by adjusting the amount of ozone generated and injected into the stream. Feed water quality and mineral content may also affect dissolved ozone concentration in the discharge stream.

Preferably, the dissolved ozone concentration is a concentration of between about 0.5 ppm to about 2.5 ppm, more preferably, about 1.0 ppm to about 2.5 ppm, and even more preferably about 1.5 ppm to about 2.5 ppm.

It has been discovered that crops such as lettuce and other leafy row crops can be successfully treated for reduction of mold or mildew growth, by application of an ozone concentration of at least about 1.0 ppm, and more preferably about 1.5 ppm. However, for treatment of relatively delicate plants, such as berry-bearing plants for example strawberry plants, the preferred ozone concentration is no greater than about 1.0 ppm in order to treat the plant while avoiding damage to the fruit.

The present systems and methods are useful for treating a variety of agricultural crops, for example, but not limited to, agricultural crops selected from the group of crops comprising leafy vegetable crops, cole crops, legume crops, annual fruit crops, and perennial fruit crops.

In addition, the present invention comprises means for introducing the ozone from the gaseous stream into the flow of water in the fluid passageway 20. Preferably, the means for introducing the ozone comprises a venturi injector 42 in fluid communication with the ozone generator 38. The ozone from the gaseous stream is introduced into the flow of water to provide mixing and dissolving of the ozone in the water, to form a stream of ozonated water in line 43 of the fluid passageway 20.

Preferably, the venturi injector 42 provides a source of suction through line 44 for example, for vacuum operation of the ozone generator 38. Accordingly, in this embodiment, the gaseous stream containing ozone is not "injected" into the water stream under pressure. The pressure in the ozone generator 38 may be held substantially constant, for example, in a range of about 3 inches Hg to about 5 inches Hg, regardless of other flow considerations. By operating the ozone generator 38 under negative pressure, the possibility of any substantial quantity of ozone escaping into the atmosphere is prevented.

Optionally, the present ozone system 10 may further comprise a degassing assembly 50, connected to, or in communication with, the fluid passageway 20 downstream of the ozone injector 42, as shown schematically in FIG. 2. The degassing assembly 50 and the ozone destruction assembly 56 are not essential. For example, in other embodiments of the invention, the ozone system 10 does not include a degassing system, such in the embodiment of the invention. The preferred system provides that the ozonated water from the injector 42 passes directly to the outlet assembly 53. As is discussed hereinafter, the present system 10 is useful and effective and avoids the release of harmful and/or dangerous amounts/concentrations of ozone to the atmosphere often without the need for the assemblies 50 and 56. However, if such assemblies are used, upon the ozonated water stream in line 43 passing through the degassing assembly 50, undissolved ozone in the stream is separated and substantially removed from the stream. The processed ozonated water stream, now having undissolved ozone substantially removed therefrom, is passed from the degassing assembly 50 through line 52 of fluid flow passageway 20 to the outlet assembly 53.

The degassing assembly 50 is described in greater detail hereinafter with reference to FIG. 3, and preferably is similar in construction to a degas separator assembly sold by Del Industries, Inc. under the trade name DVX-2400, or DVX-3600.

For treating the undissolved ozone gas stream produced by the degassing assembly 50, a ozone destruct assembly 56 may optionally be provided. As the undissolved ozone gas stream exits the degassing assembly 50 through line 224, it is received by the ozone destruct assembly 56 which processes this ozone gas stream to produce harmless oxygen ($O_2$) gas which may be safely vented into the atmosphere, for example through a gas exit port 68.

The ozone destruct assembly 56, if any, preferably comprises a two stage destruction process. More specifically, the destruction assembly 56 is adapted to provide both thermal and catalytic destruction of the ozone gas passing through the destruct assembly 56. The destruct assembly 56 may be similar in construction to an ozone destruct unit sold by Del Industries, Inc. under the trade name DD-0100, and will be described in greater detail hereinafter with reference to FIG. 3.

As shown in FIG. 2, the present ozone system 10 additionally comprises outlet assembly 53, for example including sprayer heads 54 connected to the fluid passageway 20 downstream of the ozone injector 42, for dispensing the stream of ozonated water to the grapevine 12. Outlet assembly 53 includes a plurality of sprayer heads 54 oriented in various directions toward the grapevine 12 and spaced apart so as to treat all of the above-ground parts of grapevine 12, for example, the woody stock of the vine, the foliage of the vine and the berries (grapes) on the vine.

In one embodiment of the invention, the outlet assembly 53 includes an air-assisted spray rig, such as blower 55 and related piping. This spray rig may be of any construction suitable to perform the function or functions of providing a stream of gaseous component, preferably air, to provide for an assisted ozonated water spray. In one embodiment, the spray rig may be similar in construction to spray rigs conventionally used for treating crops with liquid chemicals. The spray rig should be chosen so as to have no significant detrimental effect on the ozone being dispensed on the crop being treated. The spray rig provides a high volume, low pressure air flow which is mixed with the ozonated water stream prior to dispensing the ozonated water to the crop. Such spray rig often includes a blower or fan which provides the desired flow of gaseous component. For example, the spray rig or spray assist assembly includes a central blower 55 (or alternatively, individual turbo blowers (not shown) on each dispensing head or nozzle 54) in communication with the portion of the fluid passageway 20 carrying the ozonated water.

Advantageously, the blower 55 is sized and adapted to prevent harmful concentrations of ozone gas from being released through the nozzles 54 by dilution. For example, the flow of air from the blower 55 may be as much as about 20,000 times a volume of the undissolved ozone dispensed.

In addition, the low pressure of the dispensed air/ozonated water spray mixture does not cause any substantial damage to the grapevines, and thus is beneficial relative to the use of relatively higher pressure liquid spray apparatus. High volume, low pressure spraying of air mixed with water having a high concentration of ozone disperses the ozone onto crops substantially uniformly and at concentrations effective to destroy fungi, mildew and other undesirable microorganisms, with a reduced risk of physically harming or damaging the crops.

It is noted that the spray assisted assembly utilizing the high volume, low pressure air flow, often dilutes and may even substantially destroy/remove undissolved ozone gas that may be present in the ozonated water stream, when the air is mixed or combined therewith. Thus, in accordance with the present invention, the ozone degassing and ozone destruct assemblies may not be necessary. The present systems, including spray assist assemblies and without degassing and destruct assemblies are highly advantageous, providing both cost and performance effectiveness benefits.

Methods for treating an agricultural crop are also provided by the present invention.

In a different aspect of the invention, a method for treating an agricultural crop is provided, the method comprising the steps of providing a flow of substantially ozone-free water; generating an ozone-containing gaseous stream; forming a substantially continuously flowing ozonated water stream by introducing the gaseous stream into the flow of substantially ozone-free water; and directly applying the ozonated water stream to at least a portion of an agricultural crop; the steps of generating, forming and directly applying being performed by means of a transportable water processing system.

The step of forming preferably comprises forming an ozonated water stream having an ozone concentration of about 0.5 ppm to about 2.5 ppm, more preferably having an ozone concentration of about 1.0 ppm to about 2.5 ppm, and even more preferably having an ozone concentration of about 1.5 ppm to about 2.5 ppm.

Generally, the preferred ozone concentration will vary depending, at least in part, upon the type of crop being treated.

The agricultural crop is preferably an agricultural crop selected from the group of agricultural crops consisting of leafy vegetable crops, cole crops, legume crops, annual fruit crops, and perennial fruit crops.

For example, in some embodiments of the invention, the agricultural crop is a leafy vegetable crop, for example a crop of lettuce plants. In this case, it has been discovered that the step of forming preferably comprises forming an ozonated water stream having a dissolved ozone concentration of at least about 1.0 ppm, and more preferably having a dissolved ozone concentration of at least about 1.5 ppm.

In other embodiments of the invention, the agricultural crop being treated is a low growing, leafy plant bearing delicate fruits, for example a crop of strawberry plants. In this case, it has been discovered that the step of forming preferably comprises forming an ozonated water stream having a dissolved ozone concentration of no greater than about 1.0 ppm, in order to treat the plant without causing damage to the delicate fruit which may occur upon application of higher concentrations of dissolved ozone.

Preferably, for the treatment of open, leafy, low growing row crops, the step of directly applying comprises applying the stream of ozonated water as droplets of ozonated water, for example onto leafy portions of the crop, in lieu of applying the stream of ozonated water with the assistance of a high pressure and/or blower assisted sprayer.

For example, the step of directly applying comprises applying the stream of ozonated water from a liquid nozzle.

The present systems, as described elsewhere herein, may be employed in practicing the present methods.

In one very useful embodiment, the present methods further comprise transporting the ozonated water stream on a motorized vehicle prior to the dispensing step. In some embodiments of the invention, the method comprises the step of transporting the water processing system, intact (that is, without prior disassembly and/or later reassembly of the system) to another portion, for example another row, of the agricultural crop, and then repeating the steps of generating ozone gas, forming an ozonated water stream, and directly applying the ozonated water stream to the plants. In another embodiment of the invention, for example the embodiment shown in FIG. 1a for treating relatively low growing, leafy row crops, the ozonated water stream is dispensed and directly applied to the plant 16 by means of a liquid nozzle 55a, for example as a flowing stream or in the form of ozonated water droplets 55b, without the addition of an air assist blower assembly such as shown and described elsewhere herein. This embodiment provides for less escape of undissolved ozone gas from the discharge stream and more stable concentrations of dissolved ozone being applied to the plant leaves, and is especially advantageous for low growing row crops.

In one embodiment of the invention, the ozone system 10 is designed to be a portable unit that can be connected to a variety of water sources having different pressure and flow capacities. The ozone generator 38, oxygen concentrator 40, venturi injector 42, degassing assembly 50 (if any), ozone destruct assembly 56 (if any) and blower 55 are all contained within a housing 80 (see FIG. 1), sized and adapted to be mounted to a vehicle, for example the motorized vehicle 30 shown in FIG. 1. The housing 80 may be made of stainless steel or other suitable material or combination of materials. The water source 26 may also be mounted to the vehicle 30, and initial water pressure to the system 10 is provided by means of a pump assembly 84 which may be powered by the vehicle motor, for example by means of power line 86 connecting the vehicle motor with a pump assembly motor (not shown).

Turning back to FIG. 2, the system 10 may further comprise a pressure regulator subsystem 90 located within the housing 80 (FIG. 1), connected to the fluid flow passageway 20, and adapted to control internal fluid pressure of the system 10. Preferably, the pressure regulator subsystem 90 is structured and adapted to control pressure of fluid flow in a plurality of locations along the fluid passageway, for example both downstream and upstream of the venturi injector 42. More specifically, the pressure regulator subsystem 90 is adapted to reduce an initial pressure of the incoming water stream to between about 10 psi to about 15 psi, and then to increase the pressure to a pressure sufficient for operating the venturi injector 42, for example to about 110 psi.

Figure 3:
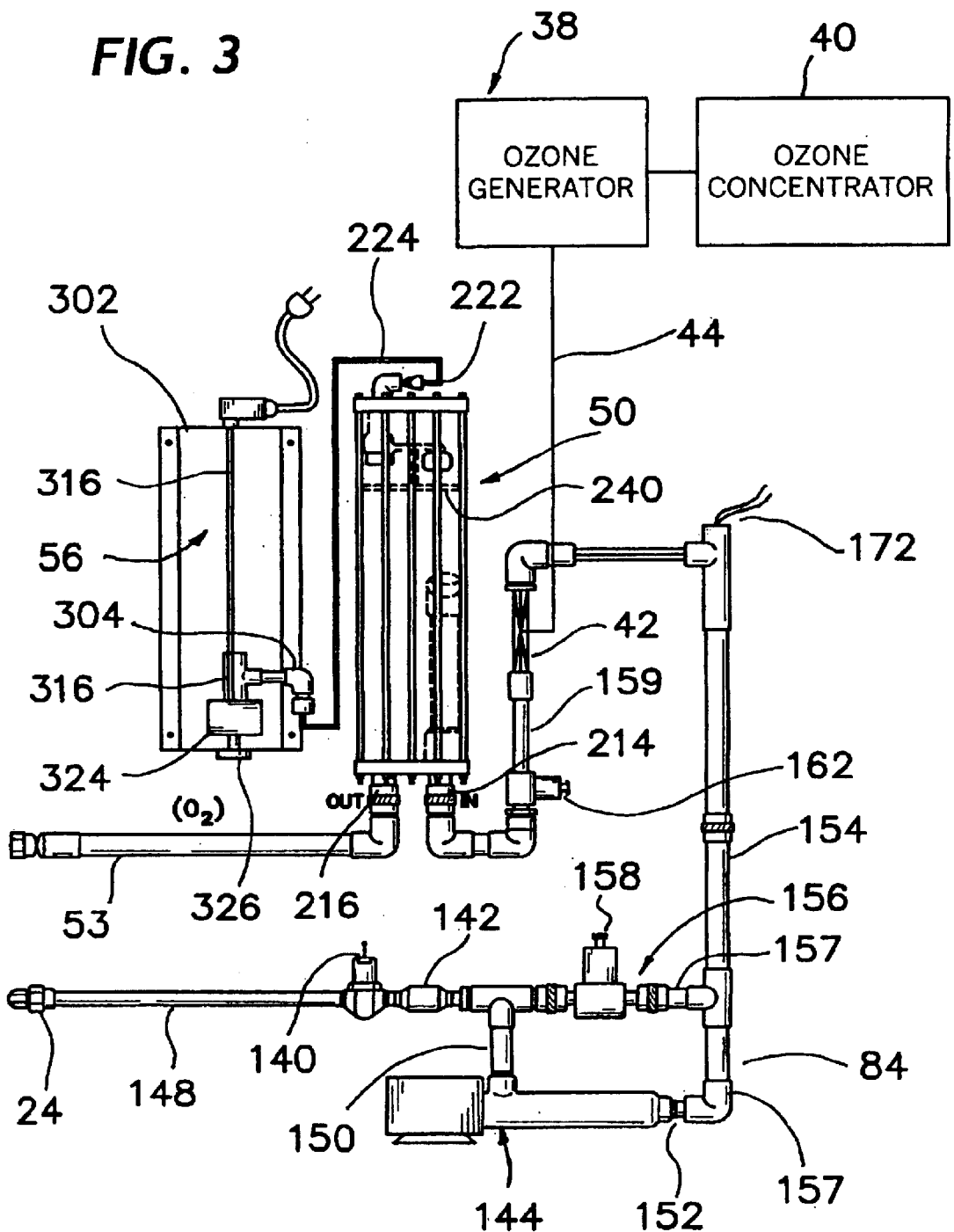
FIG. 3 is a plan view of a suitable arrangement of components of the ozone system shown in FIG. 2.

Turning now to FIG. 3, a plan view of some of the components of the system 10 suitably arranged within the housing 80 (not shown in FIG. 3) is shown. On the upstream side of the venturi injector 42, the pressure regulator subsystem 90 may include a pressure regulating valve 140, a check valve 142, and a pressure pump 144. A line 148 places the inlet 24 in fluid communication with an intake 150 of the pressure pump 144.

Functionally installed in line 148 is the pressure regulating valve 140 and the check valve 142, with the check valve 142 being downstream of the regulating valve 140.

The valve 140 reduces the pressure of the incoming aqueous stream (i.e. the water stream from water source 26 not shown in FIG. 3) to below the low end of the water supply pressure range. For example, the pressure regulating valve 140 may be adapted to reduce the initial pressure of the stream to between approximately 10 psi to approximately 15 psi. The incoming aqueous stream is controlled to a maximum setting in order to stabilize initial pressure of the aqueous stream and prevent over-pressurization of internal components of the system 10.

The check valve 142 is provided in line 148 to prevent backflow of the aqueous stream in the system 10 to the water supply. Another function of the check valve 142 is discussed below in conjunction with bypass valve 146.

The pressure pump 144 may have a capacity of approximately 10 gallons per minute at approximately 110 psi, in order to provide sufficient pressure of water for injection of ozone gas in venturi injector 42. As shown in FIG. 3, the pressure pump intake 150 is in fluid communication with line 148, and pump discharge 152 is in fluid communication with water line 154 leading to the venturi injector 42.

The pressure regulating subsystem 90 preferably includes a bypass arrangement 156 for allowing substantially unrestricted flow capacity to the pressure pump 144. For example, at least a portion of the aqueous stream discharging the pressure pump 144 at 152 may be recirculated through a bypass line 157 to the pressure pump intake 150. A bypass valve 158 is shown installed in the bypass line 157 for controlling the rate and amount of water being recirculated. The bypass arrangement 156 enables the pressure pump 144 to operate at full capacity regardless of variations in the flow of incoming aqueous stream or variations in the flow of the ozone/aqueous discharge stream through outlet line 53.

The aqueous stream discharging from the pressure pump 144 along line 154 is injected with ozone-containing gas from the ozone generator 38 to produce the ozonated aqueous stream (i.e. ozone dissolved in water) in line 159. The ozone dissolved in the discharge stream is preferably greater than approximately 0.5 ppm, and more preferably, is greater than about 1 ppm. By having the dissolved ozone in the discharge stream be greater than about 1 ppm, the ozone concentration is effectively high enough to kill microorganisms such as bacteria, virus, mold, spores, yeast, mildew and fungus.

Effective dissolution of ozone gas in the aqueous stream is ensured by means of high pressure flow of about 110 psi into the venturi injector 42. In effect, the pressurized water from pressure pump 144 is "injected" with ozone-containing gas to provide mixing and dissolving of the ozone gas in the water. As mentioned hereinabove, the ozone generator 38 is operated under negative pressure.

Preferably, the pressure regulator subsystem 90 also includes a back pressure regulator 162 installed downstream of the venturi injector 42 for maintaining a constant pressure of ozonated water from the injector 42.

Another advantageous feature of the present invention is a flow switch 172 installed along the fluid passageway 20 and adapted to detect flow in the venturi injector 42 upon the opening of an outlet valve, for example spray valve (not shown) to dispense ozonated water from sprayer heads 54 onto the crops. For example, upon opening of the spray valve, water flow is detected through the venturi injector 42 which will activate the pressure pump 144 as well as the ozone generator 38. This arrangement ensures that ozone is only being generated and the pressure pump 144 is only operating when the venturi injector 42 is operating.

The optional degassing assembly 50 and the ozone destruction assembly 56 (hereinafter sometimes referred to as the "ozone destruct unit") may be more clearly understood with specific reference to FIG. 3. If such assemblies 50 and 56 are included in system 10, the ozonated water stream from injector 40 is passed through the degas separator 50 through an inlet port 214 and discharge the degassed ozone/aqueous discharge stream through an outlet port 216 at substantially the same pressure. An undissolved ozone gas stream exits the degas assembly 50 through a gas exit port 222, and is directed into the ozone destruction assembly 56 through line 224.

Preferably, the ozone destruction assembly 56 provides a two stage ozone destruction process. More specifically, the destruct unit 56 is adapted to provide both thermal and catalytic destruction of the ozone gas.

The ozone destruction assembly 56 may include a housing 302 with a gas entrance inlet 304. Within the housing 302 is a heating element 316 adapted to be connected to a 120 V power source for example, and a chamber 324 containing a catalyst (not shown) capable of converting the undissolved ozone into oxygen. The catalyst preferably is manganese dioxide, although other suitable ozone destruct catalysts, such as activated carbon, may be employed. The undissolved ozone gas is directed through the inlet 304 and is heated and dried by the heating element 316. The heated gas is directed through the catalyst chamber 324 prior to being discharged as an oxygen stream ($O_2$) through an outlet 326. Heating of the gas stream provides for a more rapid, efficient rate of ozone destruction by the catalyst. In addition, the heating inhibits condensation formation in the destruct unit 56.

It is desirable to prevent water from reaching the catalyst in the catalyst chamber 324. Accordingly, means are preferably provided for preventing water from entering the ozone gas line 224. A ball valve arrangement (not shown) may be provided for closing the gas line 224 in the event a level of the ozone/aqueous liquid in the degas assembly 22 approaches the outlet 222. In addition, a surface turbulence reducer 240 may be provided in the degas assembly 50. The reducer 240 may be comprised of a perforated disk extending laterally across the interior of the degas assembly 50.

The present systems produce an ozonated water stream having a dissolved ozone concentration, preferably between about 0.5 ppm to about 2.5 ppm. The concentration of dissolved ozone in the ozonated water is effective in controlling and/or managing the growth and/or spread of mildew, mold and other harmful microorganism-based infestations, without the need to recirculate ozonated water through an ozone injector, or store any ozonated water, in order to reach a sufficiently high ozone concentration. Furthermore, despite this relatively high ozone concentration, the ozonated water stream is discharged from the present systems without any significant detrimental effect of the ozone on the humans operating the systems or on the environment.

In a different aspect of the invention, a method for treating an agricultural crop is provided, the method comprising the steps of providing a flow of substantially ozone-free water; generating an ozone-containing gaseous stream; forming a substantially continuously flowing ozonated water stream by introducing the gaseous stream into the flow of substantially ozone-free water; and directly applying the ozonated water stream to at least a portion of an agricultural crop; the steps of generating, forming and directly applying being performed by means of a transportable water processing system.

The step of forming preferably comprises forming an ozonated water stream having an ozone concentration of about 0.5 ppm to about 2.5 ppm, more preferably having an ozone concentration of about 1.0 ppm to about 2.5 ppm, and even more preferably having an ozone concentration of about 1.5 ppm to about 2.5 ppm.

In another aspect of the invention, the agricultural crop is an agricultural crop selected from the group of agricultural crops consisting of leafy vegetable crops, cole crops, legume crops, annual fruit crops, and perennial fruit crops, and the dissolved ozone concentration is selected based, at least in part, upon the type of crop being treated.

For example, in some embodiments of the invention, the agricultural crop is a leafy vegetable crop, for example a crop of lettuce plants. In this case, it has been discovered that the step of forming preferably comprises forming an ozonated water stream having a dissolved ozone concentration of at least about 1.0 ppm, and more preferably having a dissolved ozone concentration of at least about 1.5 ppm.

In other embodiments of the invention, the agricultural crop being treated is a low growing, leafy plant bearing delicate fruits, for example a crop of strawberry plants. In this case, it has been discovered that the step of forming preferably comprises forming an ozonated water stream having a dissolved ozone concentration of no greater than about 1.0 ppm, in order to treat the plant without causing damage to the delicate fruit, which may occur upon application of higher concentrations of dissolved ozone.

Preferably, for the treatment of open, leafy, low growing row crops, the step of directly applying comprises applying the stream of ozonated water as droplets of ozonated water, for example onto leafy portions of the crop, in lieu of applying the stream of ozonated water with the assistance of a high pressure and/or blower assisted sprayer.

For example, the step of directly applying comprises applying the stream of ozonated water from a liquid nozzle.

The present systems, as described elsewhere herein, may be employed in practicing the present methods.

In one very useful embodiment, the present methods further comprise transporting the ozonated water stream on a motorized vehicle prior to the dispensing step. In some embodiments of the invention, the method comprises transporting the water processing system, intact (for example without prior disassembly and or later reassembly of the system) to another location, for example another row of the agricultural crop being treated, and then repeating the steps of generating ozone gas, forming an ozonated water stream, and directly applying the ozonated water stream to the plants, for example using a spray assist assembly or a liquid nozzle.

While this invention has been described with respect to various specific examples and embodiments, it is to be understood that the invention is not limited thereto and that it can be variously practiced within the scope of the following claims.

What is claimed is:

1. A method for treating an agricultural crop, the method comprising the steps of:
    providing a flow of substantially ozone-free water;
    generating an ozone-containing gaseous stream;
    forming a substantially continuously flowing ozonated water stream by introducing the gaseous stream into the flow of substantially ozone-free water, the forming step being conducted such that substantially no ozonated water is recirculated to the forming step; and
    directly applying the ozonated water stream to at least a portion of the agricultural crop;
    the steps of generating, forming and directly applying being performed by means of a transportable water processing system.

2. The method of claim 1 wherein the step of forming comprising introducing the ozone-containing gaseous stream into the flow of substantially ozone-free water no more than once, such that substantially no ozonated water is returned to the ozone-containing gaseous stream prior to the step of directly applying.

3. The method of claim 1 wherein the step of forming comprises forming an ozonated water stream having an ozone concentration of about 0.5 ppm to about 2.5 ppm.

4. The method of claim 3 wherein the step of forming comprises forming an ozonated water stream having an ozone concentration of about 1.0 ppm to about 2.5 ppm.

5. The method of claim 4 wherein the step of forming comprises forming an ozonated water stream having an ozone concentration of about 1.5 ppm to about 2.5 ppm.

6. The method of claim 1 wherein the agricultural crop is an agricultural crop that is generally less than about two feet in height above a ground level.

7. The method of claim 6 wherein the agricultural crop is an agricultural crop that is generally less than about 1 foot in height above a ground level.

8. The method of claim 1 wherein the agricultural crop is an agricultural crop selected from the group of agricultural crops consisting of leafy vegetable crops, cole crops, legume crops, annual fruit crops, and perennial fruit crops.

9. The method of claim 1 wherein the agricultural crop is a leafy vegetable crop.

10. The method of claim 9 wherein the leafy vegetable crop is a crop of lettuce plants.

11. The method of claim 10 wherein the step of forming comprises forming an ozonated water stream having a dissolved ozone concentration of at least about 1.0 ppm.

12. The method of claim 10 wherein the step of forming comprises forming an ozonated water stream having a dissolved ozone concentration of at least about 1.5 ppm.

13. The method of claim 1 wherein the agricultural crop is a crop of strawberry plants.

14. The method of claim 13 wherein the step of forming comprises forming an ozonated water stream having a dissolved ozone concentration of no greater than about 1.0 ppm.

15. The method of claim 1 wherein the step of directly applying comprises applying the stream of ozonated water as droplets of ozonated water.

16. The method of claim 1 wherein the step of directly applying comprises applying the stream of ozonated from a liquid nozzle.

17. The method of claim 16 wherein the step of directly applying comprises applying the stream of ozonated from a liquid nozzle in the form of droplets onto leafy portions of the agricultural crop.

18. The method of claim 1 further comprising transporting the water processing system, intact, to another portion of the agricultural crop and then repeating the generating forming and directly applying steps.

19. An ozone system for agricultural application, the system comprising:
    a fluid processing assembly including an inlet for receiving a substantially ozone-free flow of water from a water source;
    an ozone generator for producing a gaseous stream containing ozone;
    an ozone injector assembly, in communication with the ozone generator and the fluid processing assembly, and effective in introducing ozone from the gaseous stream into the flow of substantially ozone-free water to form a continuous stream of ozonated water; and
    a liquid nozzle assembly effective in dispensing droplets of ozonated water from the continuous ozonated water stream directly onto the agricultural crop;
    the fluid processing assembly being structured such that substantially no ozonated water is recirculated to the ozone-injector assembly; and
    the system being sized and structured to be transportable, during use, by a motorized vehicle.

20. The system of claim 19 wherein the fluid processing assembly is structured such that substantially no ozonated water is stored in the system.

21. The system of claim 19 that is structured to be effective in forming an ozonated water stream having an ozone concentration of between about 0.5 ppm to about 2.5 ppm.

22. The system of claim 19 that is structured to be effective in forming an ozonated water stream having an ozone concentration of about 1.0 ppm to about 2.5 ppm.

23. The system of claim 19 that is structured to be effective in forming an ozonated water stream having an ozone concentration of about 1.5 ppm to about 2.5 ppm.

24. The system of claim 19 wherein the liquid nozzle assembly is structured to be effective in facilitating application of the ozonated water droplets onto a portion of an agricultural crop that is generally less than about two feet in height above a ground level.

25. The system of claim 19 further comprising an oxygen concentrator assembly for producing an oxygen-enriched gaseous stream as a feed gas for the ozone generator.

26. The system of claim 19 further comprising a pressure regulator subsystem adapted to control pressure of fluid flow through the fluid processing assembly.

27. The system of claim 19 which further comprises a motorized vehicle for transporting the system.

* * * * *